Patented Dec. 10, 1946

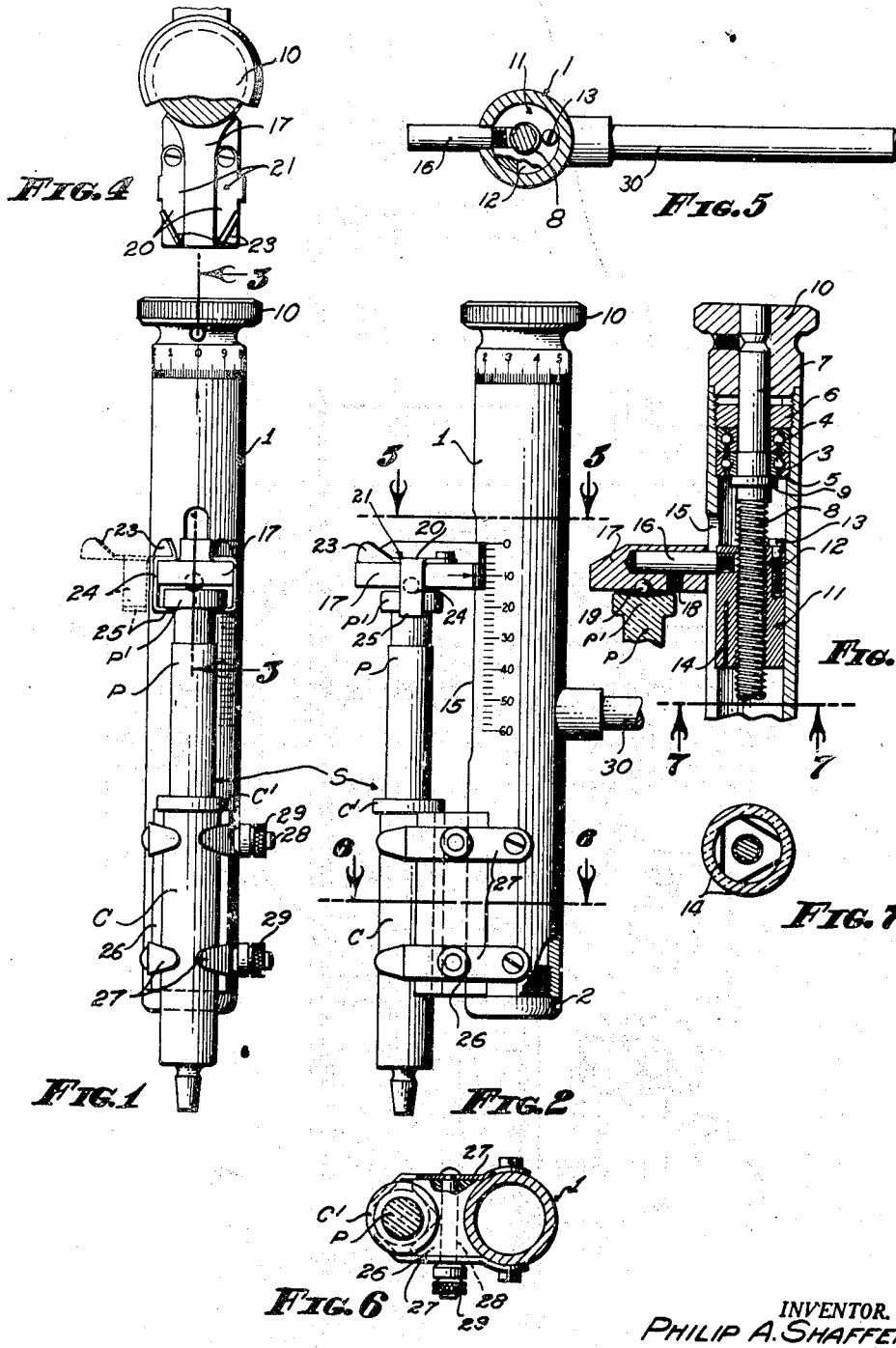

2,412,295

UNITED STATES PATENT OFFICE 2,412,295

MICROBURET

Philip A. Shaffer, Jr., Pasadena, Calif., assignor to California Institute Research Foundation, Pasadena, Calif., a corporation of California Application August 7, 1944, Serial No. 548,323

7 Claims. (Cl. 222—26)

My invention relates to microburets and among the objects of my invention are:

First, to provide a microburet which makes possible accurate measurement of liquids used in titration procedures and is particularly adapted for use in conjunction with the analysis of extremely small samples such as used in microchemical procedures.

Second, to provide a microburet which interchangeably receives and operates glass syringes containing the various liquids used for titration.

Third, to provide a microburet which, though accurately controlling the movement of the plunger into the cylinder of a glass syringe, places no side thrust on the plunger so that the plunger moves freely.

Fourth, to provide a microburet which is compact and easily operated.

With the above and other objects in view which may appear hereinafter, reference is directed to the accompanying drawing in which:

Figure 1 is a front view of the microburet showing a syringe in position.

Figure 2 is a side elevational view of the microburet.

Figure 3 is a fragmentary longitudinal sectional view thereof taken through 3—3 of Figure 1.

Figure 4 is a top view of the microburet.

Figure 5 is a transverse sectional view thereof taken through 5—5 of Figure 2 with the slide bracket removed.

Figure 6 is a transverse sectional view through 6—6 of Figure 2 showing the barrel and under side of the traveler member.

Figure 7 is a transverse sectional view through 7—7 of Figure 3.

A tubular barrel 1 is closed at its lower end by a plug 2. The upper end of the barrel 1 receives ball bearings 3 and 4. The lower ball bearing 3 rests on a shoulder 5 within the barrel. A bushing 6 screw threads into the upper end of the barrel 1 and engages the upper bearing 4.

The bearings 3 and 4 fit the stem portion 7 of a drive screw 8. The lower bearing is press fitted on the stem portion 7 and abuts a shoulder 9. Slight clearance is provided between the inner race of the bearing 4 and the stem portion. The upper end of the stem portion receives a head or knob 10 for the purpose of rotating the drive screw. The head 10 includes a cylindrical portion bearing a micrometer scale which coacts with a reference line inscribed on the barrel 1 at its upper end.

The tubular barrel 1 forms a guide means which receives a traveler member 11. The traveler member 11 is provided in the form of a relatively long cylindrical nut. Near its upper end it is provided with a transverse slit 12 which is adapted to be compressed by a tension screw 13 so that slack due to the thread clearance between the traveler member 11 and drive screw 8 may be taken up. In addition, the traveler is provided with one or more longitudinal slits 14 to form segmental portions which may be spread slightly so that the traveler member 11 has nominal frictional engagement with the walls of the barrel 1.

One side of the barrel 1 is provided with a longitudinal slot 15. A lateral stem 16 is secured in the traveler member 11 and protrudes through the slot 15. The lateral stem fits into a socket formed in slide bracket 17. The end of the slide bracket adjacent the barrel 1 is curved into conformity therewith and the slide bracket is secured to the stem 16 by a set screw 18. One vertical side of the slide bracket 17 is inscribed with a reference marking which coacts with a micrometer scale disposed longitudinally on the barrel 1. The under side of the slide bracket is provided with a ball bearing 19 in order to form a hemispherical projection. This bears against the head P—1 of a plunger P forming part of a syringe S. The upper corners of the slide bracket are notched along the sides of the bracket to form shelves on which are mounted the lever arms 20 of retainer clips 21. The lever arms are journaled at their ends adjacent the barrel 1 by screws. The forward extremities of the lever arms are provided with rudimentary handle lugs 23. Depending arms 24 extend downward from the lever arms 20 and are provided with inturned extremities 25 which fit under the head P—1 of the plunger P. The retainer clips 21 are slightly flexible but are strong enough to raise the plunger in the cylinder C of the syringe.

Secured to the lower side portion of the barrel 1 is a V-block 26. The V-block is provided with a V-shaped groove adapted to accommodate the cylinder of the syringe and aline it with the ball bearing 19. Clamp arms 27 formed of spring material are secured to the sides of the barrel 1 and extend laterally along the sides of the V-block. Their extremities are inturned to grip the cylinder C and hold it in the V-groove. Two pairs of clamp arms are provided. The V-block and clamp arms thus form a holder for the cylinder C of the syringe. Each pair of clamp arms is connected by a screw 28 which extends through a hole formed in the V-block 26. One end of each screw is riveted or otherwise secured to one of the pair of clamp arms and the other or extended end of each screw receives a nut 29.

The upper end of the cylinder C is provided with a flange C—I which rests against the upper end of the V-block so that when the cylinder is clamped it remains in place as the plunger is moved downwardly therein. The clamp arms 27 are sufficiently stiff to hold the cylinder against upward movement when the plunger is withdrawn.

The barrel is provided with a mounting stem 30 by which the microburet may be secured in a suitable fitting cammed by a ring stand or similar support customarily used for chemical apparatus. By reason of the micrometer scales provided on the head 10 and on the barrel 1 the extent of movement of the plunger in its cylinder may be accurately determined.

The ball bearing and spring clip engagement between the slide bracket 17 and the plunger P avoids the application of side thrust on the plunger. This is highly desirable for even a moderate side thrust will cause the plunger to bind in the cylinder due to the snug fluid type fit which is maintained between these two members.

The syringe per se is conventional and inasmuch as they are readily inserted and removed from the V-block and slide bracket several syringes containing different liquids used in titration procedures may be used interchangeably, and the syringes may be inserted and removed several times as needed before their contents are discharged.

The various changes and alternate arrangements may be made within the scope of the appended claims, in which it is my intention to claim all novelty inherent in the invention as broadly as the prior art permits.

I claim:

1. A microburet comprising: a syringe including a cylinder and a plunger movable therein and provided with a head at its outer end; a tubular member having a slot in its side wall; a syringe cylinder mounting means on said tubular member below said slot for positioning said syringe cylinder in offset parallel relation to said tubular member; a micrometer screw journaled within said tubular member; a traveler member threaded on said screw within said tubular member; and a syringe plunger engaging bracket disposed externally of said tubular member and attached to said traveler member through said slot.

2. The combination with a syringe cylinder and plunger of a microburet comprising: a traveler guide member; means secured on said guide member for removably receiving a syringe cylinder; a traveler slidable on said guide member and including means for gripping the head of a syringe plunger; a screw for moving said traveler; a first micrometer scale incorporated with said screw and guide member; and a second micrometer scale incorporated with said traveler and guide member, whereby movement of said traveler and syringe plunger may be measured.

3. The combination with a syringe having a cylinder and plunger, of a microburet comprising: a guide member; a traveler member guided thereby; a screw member for moving said traveler member; a syringe plunger engaging bracket connected to said screw member; a syringe cylinder holder attached to said guide member; and scale means for measuring the extent of movement of said traveler and syringe plunger.

4. The combination with a syringe having a cylinder and plunger, of a microburet comprising: a tubular guide member; a traveler member guided within said guide member; a screw member for moving said traveler member; a syringe plunger engaging bracket connected to said screw member; a syringe cylinder holder attached to said guide member; and scale means for measuring the extent of movement of said traveler and syringe plunger.

5. In a microburet for metering discharge of fluid from a glass syringe wherein the syringe includes a cylinder and plunger therefor, having a head at its extended end, the combination of: a tubular barrel; a drive screw rotatably mounted in said barrel; a traveler for said drive screw equipped with a lateral projection, there being an accommodating longitudinal slot in said barrel; a sliding bracket secured to the protruding end of said projection; a V-block secured to said barrel below said sliding bracket; yieldable clamp elements on opposite sides of said V-block for holding the cylinder of a syringe against said V-block; and yieldable clips pivotally mounted on said sliding bracket and having arms adapted to engage the head of said plunger, whereby movement of said sliding bracket correspondingly moves said plunger in said cylinder.

6. In a microburet for metering discharge of fluid from a glass syringe wherein the syringe includes a cylinder and plunger therefor, having a head at its extended end, the combination of: a tubular barrel; a drive screw rotatably mounted in said barrel; a traveler for said drive screw equipped with a lateral projection, there being an accommodating longitudinal slot in said barrel; a sliding bracket secured to the protruding end of said projection; a pair of clips pivotally mounted on said bracket and having arms adapted to engage the head of said syringe and hold said head against the under side of said bracket; and means for clamping the cylinder of said syringe to the side of said barrel in alinement with said plunger.

7. In a microburet for metering discharge of fluid from a glass syringe wherein the syringe includes a cylinder and plunger therefor, having a head at its extended end, the combination of: a tubular barrel; a drive screw rotatably mounted in said barrel; a traveler for said drive screw equipped with a lateral projection, there being an accommodating longitudinal slot in said barrel; a sliding bracket secured to the protruding end of said projection; a pair of clips pivotally mounted on said bracket and having arms adapted to engage the head of said syringe and hold said head against the under side of said bracket; means for clamping the cylinder of said syringe to the side of said barrel in alinement with said plunger; a handle for said drive screw mounted at one end of said barrel; and micrometer scales for measuring movement of said handle and said sliding bracket relative to said barrel.

PHILIP A. SHAFFER, Jr.